H. B. GRANGER.
RAKE.
APPLICATION FILED JULY 25, 1914.
1,132,334.
Patented Mar. 16, 1915.
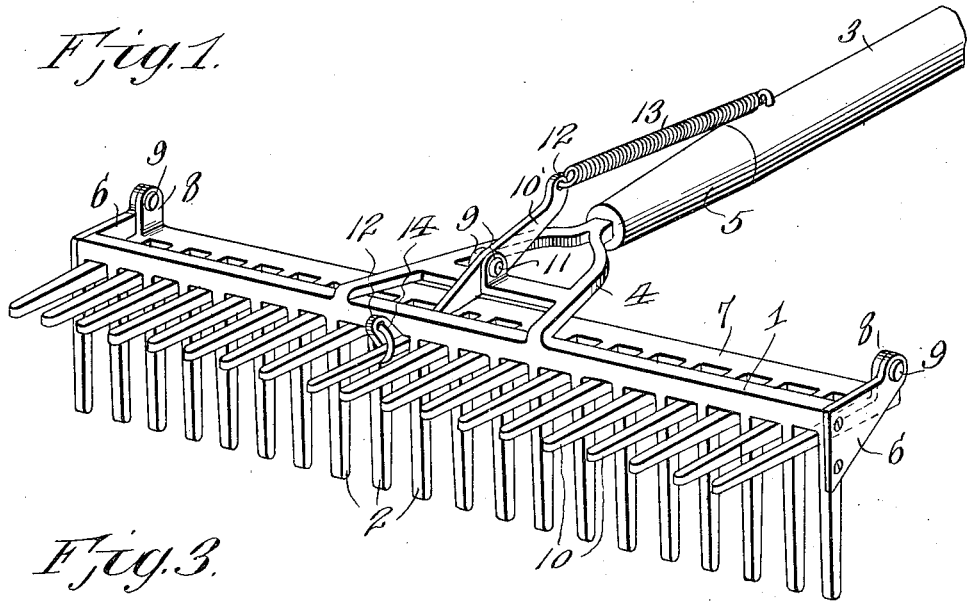
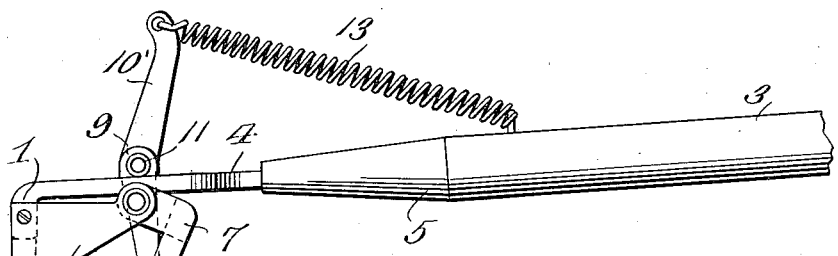
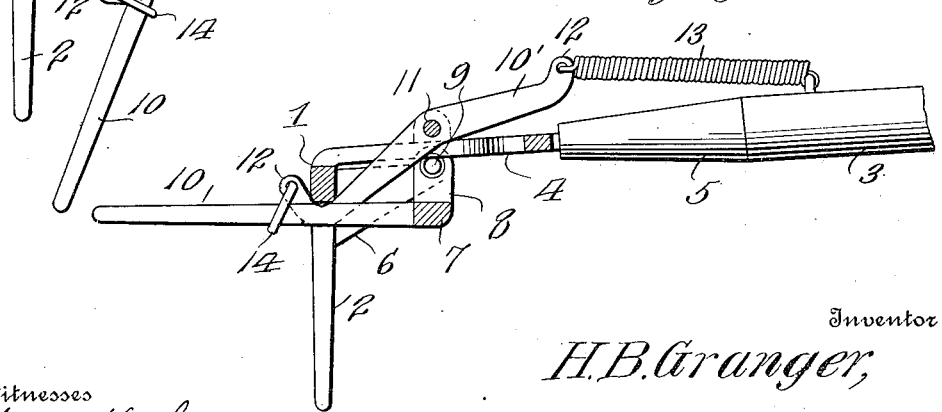
Inventor
H. B. Granger,
By Victor J. Evans
Attorney
Witnesses
Frank Hough
James J. Dougan

UNITED STATES PATENT OFFICE.

HORACE BERT GRANGER, OF ST. LOUIS, MICHIGAN.

RAKE.

1,132,334.  Specification of Letters Patent.  Patented Mar. 16, 1915.

Application filed July 25, 1914. Serial No. 853,043.

*To all whom it may concern:*

Be it known that I, HORACE B. GRANGER, a citizen of the United States, residing at St. Louis, in the county of Gratiot and State of Michigan, have invented new and useful Improvements in Rakes, of which the following is a specification.

This invention relates to cleaning devices for rakes or similar garden implements, and has for its primary object the provision of an attachment of this character which will be applicable to the standard form of rake head without necessitating any material alteration to the construction thereof, and I further contemplate providing an attachment of this character which will not interfere to an appreciable degree to the carrying or holding capacity or function of the rake head during the ordinary raking operation.

A still further object of the invention is the provision of an attachment of this character which may be operated to effect a release of the surplus material between the ordinary teeth of the rake head by a direct manual manipulation of the operating handle of the rake.

A still further object of the invention is the provision of a cleaning attachment which may be instantly put into its cleaning motion at the requisite time and without causing the operator to directly handle the same.

Another object of the invention is the provision of an attachment of this character which will be so positioned upon the rake head that after the rake is drawn to a point upon the surface of the ground where it is desired to make a deposit of the collected matter, the device may be immediately operated to effect a cleaning of the ordinary rake head, and then on the restoration of the rake head to its normal raking position the device will be instantly and automatically moved to its normal or inactive position.

With these and other objects in view, the invention consists in the arrangement and combination of parts, as will hereinafter appear in the following specification.

In the drawings: Figure 1 is a perspective view of a rake showing the attachment applied thereto. Fig. 2 is a vertical sectional view. Fig. 3 is a side elevation showing the manner of operation.

In carrying out this invention, I contemplate the provision of a cleaning attachment that may be applied to rakes or similar garden implements, having spaced teeth, and for illustration I show the attachment applied to the conventional form of rake head, which comprises an upper longitudinal bar 1 having depending teeth 2, a handle 3 and a connecting yoke 4 between the head and handle, the said yoke having a socket 5 formed thereon for the reception of one end of the handle.

Each end tooth of the rake head has a bracket member 6 detachably secured thereto and extending outwardly and upwardly therefrom, the free ends of the brackets lying above the upper edge of the longitudinal bar 1 of the rake head. Extending parallel with the bar 1 and co-extensive therewith is a shaft 7, the said shaft being spaced from the bar 1 and having its opposite ends provided with upwardly projecting flanges 8 for pivotal connection as at 9 with the free ends of the brackets. Projecting laterally from the shaft 7 and extending between the teeth of the rake, is a series of cleaning fingers 10, adapted to be withdrawn from the spaces, as hereinafter described, to effect the release of any material held within the spaces during the raking operation. The length of these cleaning fingers greatly exceeds the length of the rake teeth and during the raking operation the said fingers are held in close proximity to the lower edge of the bar 1 of the rake head, so as not to interfere in any way with the raking operation. This is accomplished by the free ends of the brackets extending above the longitudinal bar 1 of the rake head and having their suspending flanges 8 of sufficient length to permit the points of connection between the fingers and the shaft 7 to be slightly disposed below the lower edge of the bar 1 of the rake head.

Projecting upwardly from the yoke 4, and adjacent the point of connection between the yoke and the socket 5, is a pair of spaced ears 9 between which is journaled a lever 10, by means of a shaft 11 extending through the ears and the lever. The opposite terminals of the lever 10 are bent upwardly, as shown at 12, and one end of the lever has connection with the handle of the rake by means of a coiled spring 13. The opposite end of the lever extends downwardly between the sides of the yoke 4 and through the space between the shaft 7 and the bar 1 of the rake head. This last mentioned end of the lever is positioned at one side of the cleaning finger, located within the space, and is terminally provided with a ring 14, adapted to slidably receive the adjacent cleaning finger, and operating to return the cleaning fingers after the cleaning operation, to the position shown in Fig. 1.

The operation of removing the collected material from the spaces between the teeth of the rake head, is effected as follows: the rake handle is forced in a direction away from the operator until the points of the cleaning fingers engage in the ground. As before stated the length of the cleaning fingers exceeds that of the rake teeth, so that when the points of the fingers engage in the ground, the rake head will be elevated, thereby withdrawing the rake teeth from engagement with the ground. The handle is then drawn toward the operator, thereby causing the rake head to rock on the pivotal connection between the brackets 8 and the shaft 7, resulting in the withdrawal of the fingers from the spaces between the teeth and removing the collected material. During the rocking of the rake head, the end of the lever 10, which has connection with one of the cleaning fingers, is drawn downwardly, raising the opposite end of the lever and tensioning the spring 13, so that when the fingers are withdrawn from the ground, the spring will automatically cause them to return to the position shown in Fig. 1.

What I claim as new, is:

1. The combination with a rake head having a yoke member thereon and a handle connected to the yoke, of a rock shaft carried by the rake head and underlying the yoke and having a series of cleaning fingers projecting through the spaces between the rake teeth, a lever carried on the yoke and having one end extending downwardly between the arms of the yoke and having a slidable connection with one of the cleaning fingers, and means connecting the opposite end of the lever to the handle of the rake for returning the rock shaft and teeth to their initial position after the cleaning operation.

2. The combination with a rake head and a handle carried thereby, bracket members mounted on the rake head, a rock shaft mounted on the bracket members and having a series of cleaning fingers projecting through the spaces between the rake teeth, a lever mounted on the head and having one end extending through the space between certain adjacent rake teeth and terminally extended upward, a ring member carried by the upwardly extending end and receiving one of the cleaning fingers, and means connected to the opposite end of the lever and to the rake handle for returning the rock shaft and fingers to their initial position after the cleaning operation.

In testimony whereof I affix my signature in presence of two witnesses.

HORACE BERT GRANGER.

Witnesses:
OTTO F. MEY,
EDWARD LIPPINCOTT.

Copies of this patent may be obtained for five cents each, by addressing the "Commissioner of Patents, Washington, D. C."